United States Patent
Braiato et al.

(10) Patent No.: US 6,857,509 B1
(45) Date of Patent: Feb. 22, 2005

(54) BRAKING UNIT

(75) Inventors: Antonio Braiato, Turin (IT); Andreas Pachner, Uhingen (DE); Hans-Georg Riedel, Pforzheim (DE); Detlef Sokolowsky, Ostfildern (DE); Björn Spangemacher, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/869,134

(22) PCT Filed: Dec. 21, 1999

(86) PCT No.: PCT/EP99/10234

§ 371 (c)(1),
(2), (4) Date: Nov. 30, 2001

(87) PCT Pub. No.: WO00/39477

PCT Pub. Date: Jul. 6, 2000

(30) Foreign Application Priority Data

Dec. 23, 1998 (DE) ........................................ 198 59 839

(51) Int. Cl.[7] ....................... F16D 55/228; F16D 65/12; F16D 65/092

(52) U.S. Cl. ............................ 188/72.5; 188/218 XL; 188/250 R

(58) Field of Search ........................... 188/72.5, 218 L, 188/251 A, 251 M, 250 R

(56) References Cited

U.S. PATENT DOCUMENTS

| | | | | |
|---|---|---|---|---|
| 2,768,710 A | * | 10/1956 | Butlet ........................ | 188/72.5 |
| 3,348,636 A | * | 10/1967 | Boyles ....................... | 188/72.5 |
| 4,077,499 A | * | 3/1978 | Baram ........................ | 188/72.5 |
| 5,339,931 A | * | 8/1994 | Jacko et al. ........... | 188/251 M |
| 5,477,944 A | * | 12/1995 | Bryan et al. ............. | 188/72.5 |
| 5,509,510 A | * | 4/1996 | Ihm ....................... | 188/218 XL |
| 5,705,008 A | * | 1/1998 | Hecht ......................... | 156/148 |
| 5,975,256 A | * | 11/1999 | Kondoh et al. ......... | 188/251 A |
| 6,302,246 B1 | * | 10/2001 | Naumann et al. ..... | 188/218 XL |

FOREIGN PATENT DOCUMENTS

| | | | |
|---|---|---|---|
| EP | 0-730-106 A1 | * | 9/1996 |
| JP | 61-167723 A | * | 7/1986 |
| JP | 62-124244 | | 6/1987 |
| JP | 3-46026 | | 1/1991 |
| JP | 4-7739 | | 1/1992 |
| WO | WO-98-55778 A1 | * | 12/1998 |

OTHER PUBLICATIONS

Wirth, "Isobar Enhances Disc Brake Performance", Railway Gazette International, Jul. 1997, pp. 477–480.*
Letter dated Jan. 13, 2004, from Orion International Patent Office translating Office Action from Japanese Patent Office.
Copy of Office Action from Japanese Patent Office dated Dec. 2, 2003, with English translation.

* cited by examiner

Primary Examiner—Thomas Williams
(74) Attorney, Agent, or Firm—Crowell & Moring LLP

(57) ABSTRACT

A braking unit has (1) at least two brake shoes, each with a friction lining; (2) at least one brake disk rotor each of the outer surfaces of the brake disc rotor at least partially forming a friction surface of a ceramic-metal composite material for each friction lining respectively; and (3) at least one brake application device that acts on the brake shoes during braking operation. The friction linings of the brake shoes cover at least 15% of the friction surface of the brake shift rotor. The at least one brake application device is arranged so that the pressure which acts on the brake shoes during the braking operation acts essentially evenly on the friction surface.

21 Claims, 3 Drawing Sheets

BRAKING UNIT

BACKGROUND AND SUMMARY OF INVENTION

The present invention relates to a brake unit, which has at least two brake shoes, each with a friction lining, and at least one brake disc rotor, the outer surfaces of the brake disc rotor each having at least partially a friction surface composed of a metal/ceramic composite material (CMC) for respective friction linings, and at least one application device, which acts upon the brake shoes during the braking operation.

Conventional brake units, especially in motor vehicles, generally have brake disc rotors made from a cast-iron material or grey cast iron. However, the trend is towards using brake disc rotors made from a ceramic/metal composite material or for at least the friction surfaces of the brake disc rotor to be composed of a ceramic/metal composite material. Components of this kind are disclosed by DE 44 38 456 A1, for example.

When brake disc rotors of this kind are used in brake units of conventional design, however, the temperatures that occur at the friction surfaces, especially during braking operations that involve a high braking power, are significantly above those at comparable brake disc rotors made of cast iron material and cannot be tolerated by the friction linings of the brake shoes that are normally used. This results in "fading phenomena" and high wear on the brake linings.

It is therefore the object of the invention to provide a brake unit of the abovementioned type in which brake disc rotors with friction surfaces made from a ceramic/metal composite material and customary brake linings are combined in a compatible way.

The solution comprises the friction linings of the brake shoes covering at least 15% of the friction surface of the brake disc rotor, the at least one application device being designed in such a way that the pressure acting on the brake shoes acts essentially uniformly on the friction surface during the braking operation.

Thus, according to the invention, the disadvantage of the relatively poor thermal tolerance of the friction linings of the brake shoes is compensated for by increasing the surface area of the friction linings that acts on the friction surface of the brake disc rotor, the friction linings simultaneously being pressed against the friction surface of the brake disc rotor as uniformly as possible thanks to homogeneous introduction of the application forces, with the result that there is no local increase in the thermal flux density.

Advantageous developments will become apparent from the subclaims. An advantageous embodiment of the present invention consists in that the ratio of the mean height to the mean width of each friction lining of a brake shoe is approximately 1:1 to 1:1.6.

Another advantageous development envisages that an application device is provided, which acts on at least two brake shoes, at least two pistons being provided per brake shoe. The brake shoes are thus pressed into contact in such a way under the action of two or more, preferably two to four, pistons that uniform pressure is ensured, even under the action of the braking torque. In another embodiment of the present invention an application device is provided, which acts on at least four brake shoes, at least two pistons being provided per brake shoe. These are therefore application devices of comparatively simple configuration with multiple-piston callipers, preferably two-, three- or four-piston callipers. The more pistons are provided for each calliper, the more advantageous it is to provide either compressible friction linings or a compressible intermediate layer between the friction lining and the calliper, in each case preferably with a compressibility of more than 1 $\mu$m/bar brake fluid pressure.

Another advantageous refinement of the present invention consists in that a plurality of individual friction linings, each with associated individual application devices, is provided. This can be accomplished by means of single-piston callipers or multiple-piston callipers, in which one or more, preferably two to six, particularly preferably four or six, brake shoes are arranged. The friction surfaces of these brake shoes are advantageously large in the radial direction but comparatively small in the circumferential direction.

The at least one application device can furthermore have mechanical and/or electronic compensation elements, which are designed in such a way that the application forces are distributed uniformly to a plurality of friction linings using the principle of balanced levers. An improvement in the pressure is achieved by this means. An improvement in the pressure between the brake disc rotor and the brake shoes can also be achieved by using friction linings with a compressibility of over 1 $\mu$m/bar brake fluid pressure and/or an intermediate layer, provided between the friction linings and the application device, with a compressibility of over 1 $\mu$m/bar brake fluid pressure.

Especially when using more than two hydraulically actuated pistons, e.g. eight pistons, in conjunction with four friction linings per application device, it is advantageous if the pistons are arranged in such a way that the pressure acting on the brake shoes is as uniform as possible, in particular for operating friction coefficients of about 0.40 to 0.45.

To suppress braking noise, it is furthermore advantageous to configure the way in which the brake disc rotor is acted upon by the friction linings in such a way that both vibration nodes and vibration antinodes of the critical K0/3 vibration of the brake disc rotor are prevented. This is achieved by virtue of the fact that two brake shoes per friction surface of the brake disc rotor are arranged in such a way that their lines of action enclose an angle a of about 110 to 130°.

Another advantageous development envisages that at least the friction surface of the brake disc rotor or the entire brake disc rotor or the entire brake disc should be composed of a ceramic/metal composite material, preferably an aluminium/ceramic composite material, e.g. one based on aluminium oxide, titanium dioxide, boron trioxide and/or titanium boride with aluminium, as described, for example, in German patent application 197 06 925.8-45, or a silicon/ceramic composite material, e.g. one based on silicon carbide. A fibre-reinforced composite material that has carbon fibres and/or silicon carbide fibres, for example, as reinforcing fibres is particularly preferred. However, other fibres based on carbon, nitrogen, silicon or boron are also suitable.

Long fibres, preferably in the form of woven fibre structures or nonwoven scrims, are suitable as reinforcing fibres. Short fibres, preferably isotropically oriented short fibres (cf. DE 197 11 829 C1), are particularly preferred, ensuring that the friction surface and/or brake disc has isotropic, i.e. uniform, properties both in the longitudinal and in the transverse direction.

As the ceramic component, the composite material can contain a silicon carbide ceramic or an aluminium oxide ceramic, for example. However, other ceramics are also suitable.

The friction surface of the brake disc rotor and the brake disc rotor are preferably formed in one piece and are composed of the same material, i.e. of a CMC material. It is particularly preferred to produce the entire brake disc in one piece of a CMC material, making manufacture particularly simple and economical.

BRIEF DESCRIPTION OF THE DRAWINGS

The present invention is described in greater detail below with reference to the attached drawings, in which.

DETAILED DESCRIPTION OF THE DRAWINGS

Figure 1:
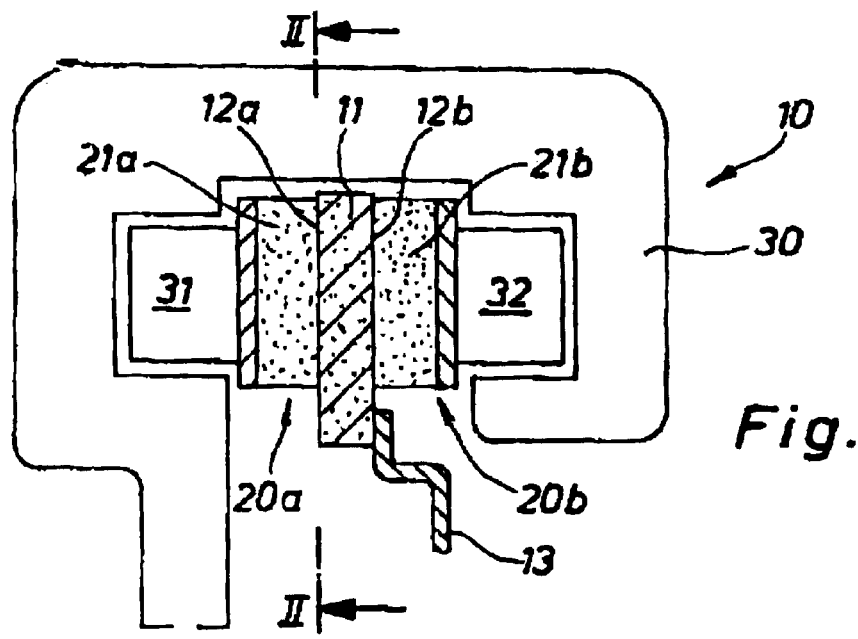
FIG. 1 shows a schematic representation of a brake unit according to the invention, which is not to scale.

FIG. 1 shows a brake unit 10 with a brake disc rotor or brake disc 11 composed of a ceramic/metal composite material, the outer surface of which is formed by friction surfaces 12a, 12b. The brake disc 11 is fixed in a manner known per se (not shown specifically) by means of a brake-disc chamber or adapter 13. The brake unit 10 furthermore has two brake shoes 20a, 20b with friction linings 21a, 21b, which act on the friction surfaces 12a, 12b of the brake disc 11 during the braking operation. An application device 30 known per se and illustrated in a purely schematic way is used to act upon piston pressure faces of brake pistons 31, 32, causing the brake shoes 20a, 20b to act on the friction surfaces 12a, 12b and initiating the braking operation. In this arrangement, the friction linings cover approximately at least 15% of the friction surface, the pressure acting on the brake shoes 20a, 20b being as uniform as possible, i.e. the friction linings are acted upon uniformly over their entire area.

Figure 2:
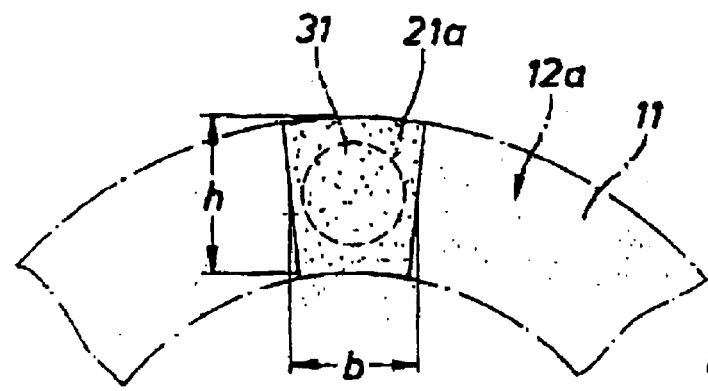
FIG. 2 shows a section along the line II—II in FIG. 1.

FIG. 2 illustrates an embodiment of the size ratio, in accordance with the invention, of the friction linings. The ratio of the mean height (h) to the mean width b, which is decisive in the case of the illustrated trapezoidal shape of the friction lining 21a, is preferably about 1:1 to 1:1.6 in order to ensure that there is a large radial overlap with the friction surface 12a. The friction surface 21a therefore tends to be large radially but comparatively small in the circumferential direction.

Figure 3:
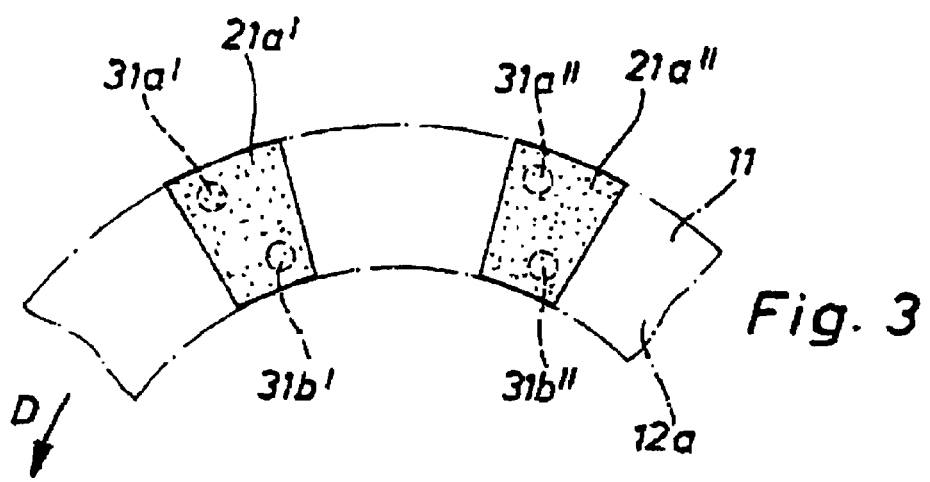
FIG. 3 shows an illustration corresponding to FIG. 2 of another embodiment of the present invention.
Figure 7:
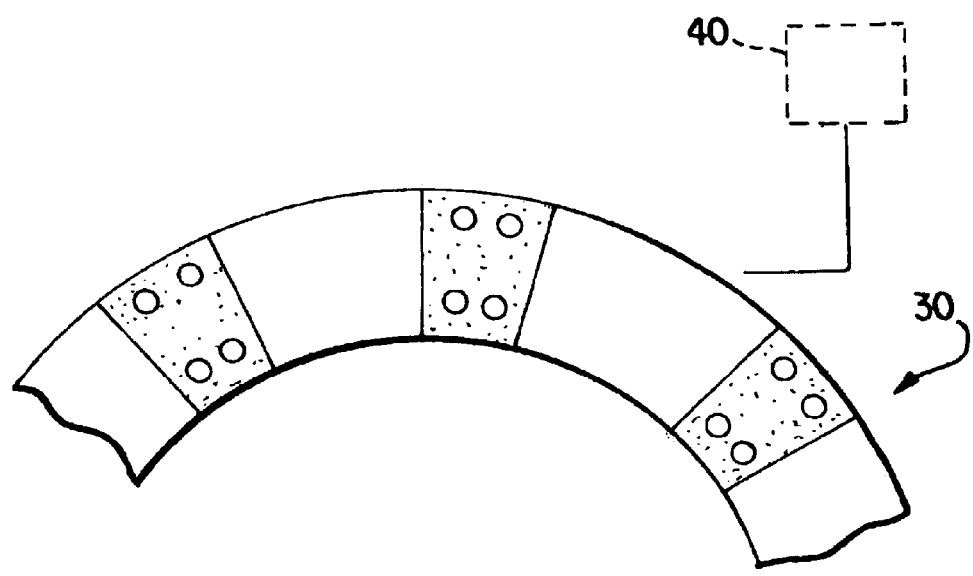
FIG. 7 shows an illustration of another embodiment of the invention.

FIG. 3 shows an embodiment of the present invention in which two friction linings 21a' and 21a" are arranged at the friction surface 12A. To improve the pressure, two hydraulically actuated pistons 31a', 31b' or 31a", 31b" are used per friction lining. In the exemplary embodiment, the pistons are distributed uniformly and arranged in such a way that there is a uniform action over the entire friction surface, especially in the case of an operating friction coefficient of between about 0.40 and 0.45, with the brake disc 11 rotating in the direction of arrow density D, ensuring that there are no local increases in thermal flux density. This can also be achieved, for example, by using eight pistons in conjunction with four linings per application device. To avoid non-uniform distribution of power, a plurality of individual friction linings, each with associated individual application devices, is preferably used. This can be accomplished by means of single-piston callipers or multiple-piston callipers, in which one or more, preferably two to six, particularly preferably four or six friction linings, are arranged. These friction linings are preferably each pressed into contact by two to four pistons in such a way that uniform pressure is ensured even under the action of the braking torque, as shown in FIG. 7. As described, the friction linings of these brake shoes are advantageously large in the radial direction but comparatively small in the circumferential direction.

Figure 4:
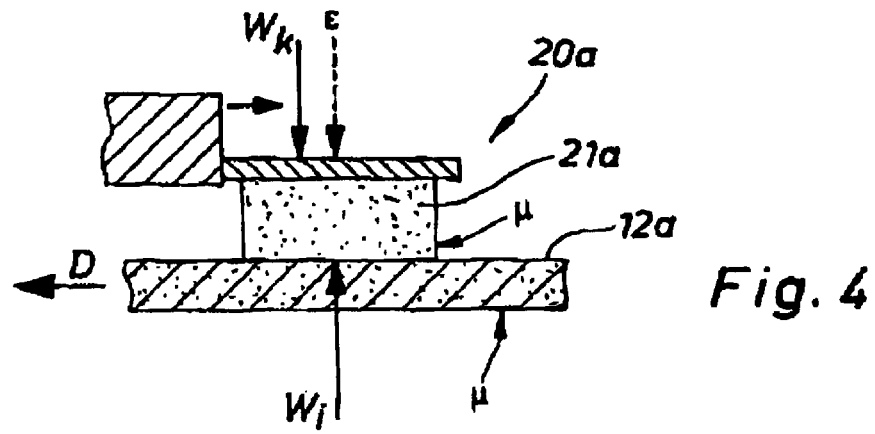
FIG. 4 shows a schematic representation of the lines of action of the shoe pressure.

One factor that is shown is that the at least one application device can furthermore have mechanical and/or electronic compensation elements 40, these being designed in such a way that the application forces are distributed uniformly to a plurality of friction linings using the principle of balanced levers. The result is illustrated schematically in FIG. 4. The line of action of the ideal pressure with the brake disc 11 rotating in the direction of arrow D and a given friction coefficient $\mu$ is denoted by Wi. The line of action of the piston is denoted by Wk. The energy $\epsilon$ introduced by the action of the piston is controlled in such a way as a function of the friction coefficient $\mu$ that the ideal pressure described is achieved. An equilibrium at the individual brake shoe and thus an improvement pressure between the disk rotor and the is brake shoes can also be achieved by using friction linings with a compressibility of over 1 $\mu$m/bar brake fluid pressure and/or an intermediate layer, provided between the friction lining and the application device, with a compressibility of over 1 $\mu$m/bar brake fluid pressure.

The same applies, of course, mutatis mutandis, to friction surface 12b.

Figure 5:
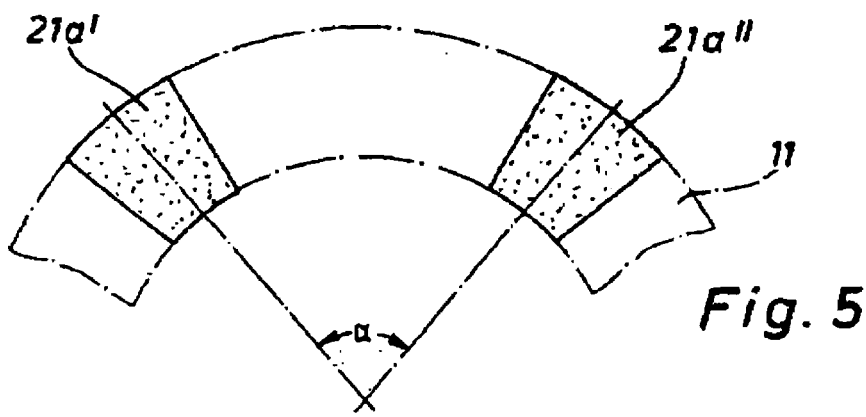
FIG. 5 shows a schematic representation of another embodiment of the present invention.
Figure 6:
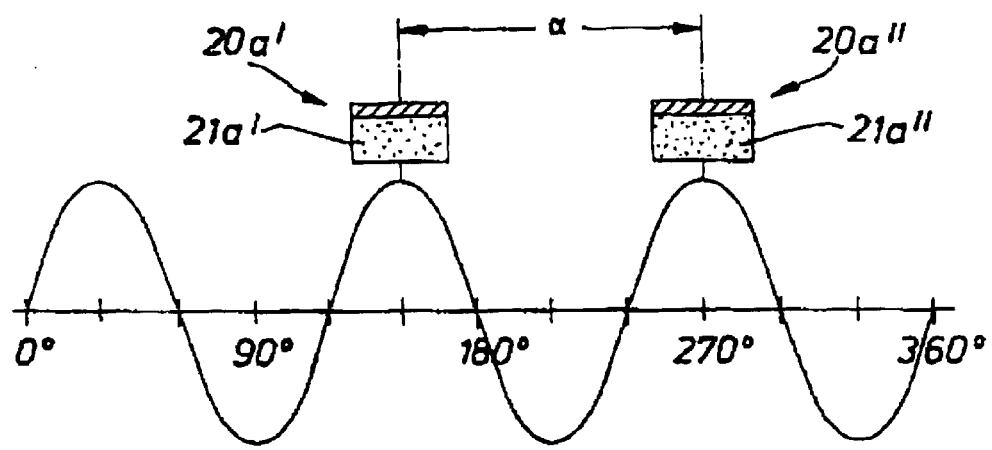
FIG. 6 shows a schematic representation of the K0/3 vibration of a brake disc rotor.

To suppress braking noise, two brake shoes 20a', 20a" per friction surface of the brake disc 11 are arranged in such a way, as shown in FIG. 5, that their lines of action enclose an angle $\alpha$ of about 110 to 130°. The result is illustrated in FIG. 6. This shows the typical K0/3 vibration of the brake disc rotor as a function of the angle of rotation of the rotor, antinodes of the K0/3 vibration being prevented by virtue of the arrangement of the friction surfaces 21a', 21a". The same applies, mutatis mutandis, to vibration nodes given appropriate arrangement of the brake shoes.

What is claimed is:

1. Brake unit, comprising:
   at least two brake shoes, each having a friction lining;
   at least two pistons per brake shoe;
   at least one brake disc rotor with outer surfaces having at least partially friction surface comprising a metal/ceramic composite material for respective friction linings;
   at least two application devices that act upon the at least two brake shoes during braking operation,
   wherein each friction lining is associated with an individual application device,
   wherein the friction lining covers at least 15% of the friction surface, and
   wherein at least two application devices are designed so that pressure acting on the at least two brake shoes act essentially uniformly on the friction surface during braking operation.

2. A brake unit according to claim 1, comprising a plurality of application devices which act on at least four brake shoes.

3. A brake unit according to claim 1, wherein single- or multiple-piston callipers, in which one or more brake shoes are arranged, are provided for each application device.

4. A brake unit according to claim 3, wherein two to six brake shoes are provided for each application device.

5. A brake unit according to claim 3, wherein four to six brake shoes are provided for each application device.

6. A brake unit according to claim 1, wherein the at least two application devices comprise mechanical and/or electronic compensation elements, which are designed so that application forces are distributed uniformly to a plurality of friction linings by the principle of balanced levers.

7. A brake unit according to claim 1, wherein the at least two pistons are arranged so that pressure acting on the at least two brake shoes is uniform.

8. A brake unit according to claim 1, wherein the at least two pistons are arranged so that pressure acting on the at least two brake shoes is for operating friction coefficients of about 0.40 to 0.45.

9. A brake unit according to claim 1, wherein two brake shoes per friction surface of the brake disc rotor are arranged so that their lines of action enclose an angle α of about 110 to 130°.

10. A brake unit according to claim 1, wherein the friction linings have a compressibility of over 1 μm/bar brake fluid pressure.

11. A brake unit according to claim 1, further comprising an intermediate layer having a compressibility of over 1 μm/bar brake fluid pressure and located between the friction linings of the brake shoes of the application device.

12. A brake unit according to claim 1, wherein at least the friction surfaces comprise an aluminum/ceramic composite material or a silicon/ceramic composite material.

13. A brake unit according to claim 1, wherein at least the friction surfaces comprise a fiber-reinforced composite material.

14. A brake unit according to claim 13, wherein the metal/ceramic composite material contains at least one of carbon fibers or silicon carbide fibers as reinforcing fibers.

15. A brake unit according to claim 13, wherein the metal/ceramic composite material contains long fibers.

16. A brake unit according to claim 15, wherein the long fibers are in the form of woven fiber structures or non-woven fiber structures.

17. A brake unit according to claim 13, wherein the metal/ceramic composite material contains short fibers.

18. A brake unit according to claim 17, wherein the short fibers are isotropically-oriented short fibers.

19. A brake unit according to claim 1, wherein the metal/ceramic composite material contains a silicon carbide ceramic or an aluminum oxide ceramic.

20. A brake unit according to claim 1, wherein the friction surface and the brake disc rotor are formed in one piece and comprise the same material.

21. A brake unit according to claim 1, wherein a ratio of a mean height to the mean width of each friction lining is approximately 1:1 to 1:1.6.

* * * * *